United States Patent [19]

Espana

[11] 4,204,437
[45] May 27, 1980

[54] FRICTION BEARING ROCK BIT AND SEGMENT, AND METHOD FOR MAKING THEM

[75] Inventor: Salvador Espana, Costa Mesa, Calif.

[73] Assignee: Smith International, Inc., Newport Beach, Calif.

[21] Appl. No.: 893,196

[22] Filed: Apr. 3, 1978

[51] Int. Cl.$^2$ ............................ B21K 5/02; C21D 1/78
[52] U.S. Cl. .................................. 76/108 A; 148/16.5
[58] Field of Search .................... 76/108 A, 108 R; 148/16 R, 16.5, 31.5; 175/374, 409–411; 308/8.2

[56] References Cited

U.S. PATENT DOCUMENTS

| | | | |
|---|---|---|---|
| 3,275,389 | 9/1966 | Neilson et al. | 308/8.2 |
| 3,661,656 | 5/1972 | Jarleborg | 148/16.5 |
| 3,922,038 | 11/1975 | Scales | 148/16.5 |
| 3,946,817 | 3/1976 | Prince | 148/16.5 |

*Primary Examiner*—Othell M. Simpson
*Assistant Examiner*—Roscoe V. Parker
*Attorney, Agent, or Firm*—Christie, Parker & Hale

[57] ABSTRACT

A rock bit segment has a cutter rotatably mounted on a journal. Loads radially of the axis of the journal are largely taken by a friction bearing pad of hard material. Ball bearings track in circular races on the journal and cutter and retain the cutter on the journal. A seal at the junction of the journal and the balance of the segment keep lubricant from escaping from the interface between the cutter and the journal and formation material from entering this interface. To provide hardened wear surfaces for the seal on the journal and segment in the ball race on the journal, on radial surfaces of the journal adjacent the pad, and at the nose of the journal, the entire rock bit segment is subjected to a carbon enrichment of the surface after the segment has been machined. Thereafter, the segment is quenched to effect a hardened case, and then the segment is tempered. Carbon in the case varies from 0.5% to 0.9% at the surface to base metal concentrations at depth, and the case is 0.010 to 0.015 inches thick.

28 Claims, 3 Drawing Figures

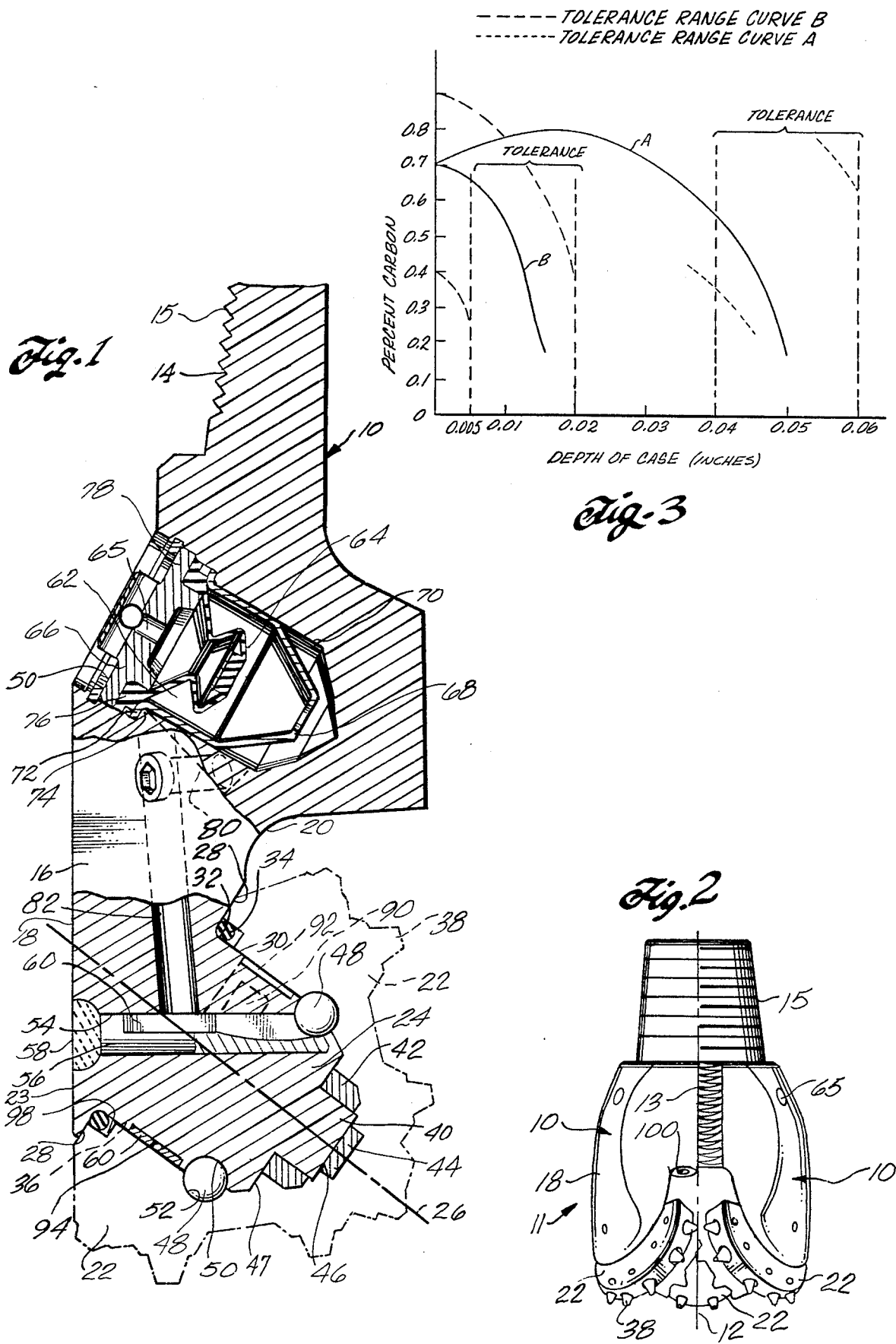

FRICTION BEARING ROCK BIT AND SEGMENT, AND METHOD FOR MAKING THEM

BACKGROUND OF THE INVENTION

The present invention relates to rotary rock bits, and, more in particular, to an improved rotary rock bit of the friction bearing type and a method for manufacturing the improved rock bit.

Rotary rock bits are used in earth boring, for example, for access to formations containing petroleum values. Typically, each rock bit has one or more legs or segments, with each segment having a journal rotatably carrying a cone cutter. The axis of the journal lies at an acute angle to both the vertical and the horizontal. Each cone cutter is compressively loaded between the bottom of the journal by the weight of the drill string and the radial surface at the bottom of the hole being drilled.

These compressive loads can be very high because of the weight of the drill string on the cutters, for the drill string can be thousands of feet in length. A friction type journal bearing can withstand these high loads better than anti-friction ball or roller bearings, so long as the friction bearing is continuously lubricated. A sealed lubricant system in communication with the friction bearing provides the lubrication, as described in U.S. Pat. No. 3,917,028. The lubrication system includes a variable volume reservoir that expands and contracts in response to pressure differentials between the lubricant and the drilling environment. The system then can adjust for changes in pressure due to drilling mud head and expansion and volatilization of the lubricant at the high temperatures of deep holes.

To improve wear of the journal bearing surface on the journal, it has been the practice to provide a hard bearing metal wear pad on the journal on that portion which sustains heavy loading. It has also been the practice to offset the axis of curvature of the wear pad from the axis of the journal to avoid squeezing a seal too much.

Ball bearings tracking in a race at the journal and on the cone cutter secure the cutter to the journal. To avoid Brinneling the race of the journal, the race and adjoining lands have been hardened by carburization and subsequent heat treatment. A wear resistant surface adjacent the O-ring seal between the journal and the leg has also been provided by carburizing and heat treatment.

The journal has a thrust face lying normal to the axis of the journal between a nose of the journal and the ball race to take the thrust of the cone cutter. Thrust may also be taken at the end of the nose of the journal which lies close to the axis of the bit. These areas, being subject to wear, have also been carburized and heat treated, or hardfaced.

In the past, the selective carburization and heat treatment has been arduous, requiring much handwork. The machined areas of the faying surfaces, where the segment abuts neighboring segments, and journal as well as other areas were stopped off. Stop off was either by ceramic based paint or by electroplated masking material. Non stopped off areas were carburized. Carburization was at an elevated temperature, for a long period of time, and in a carburizing atmosphere. For example, a carburizing atmosphere of 0.6% to 0.8% carbon potential for 15 hours and at about 1700° F. was used in carburizing a segment to obtain 0.040 to 0.060 inches depth of carburization. The part was then slowly cooled so as to avoid hardening the carburized surfaces. When the ceramic based stop-off was used, this material was then removed by hand sandblasting in the selected areas of where the grease reservoir and nozzle were to be formed. The part was then finish machined. Finish machining includes development of the grease reservoir and the nozzle. After finish machining, the part was heat treated by heating, quenching and tempering. Thereafter, all remaining ceramic stop-off was removed and the parts, wear pad and other journal wear surfaces were finished ground.

Quite obviously, the selective carburization process used in the past consumes both time and money.

In the selective carburization technique it was thought that some areas required deep carburization to withstand imposed loads, for example, the roller races. Deep carburization in other areas would be bad, however, because those areas are not thick enough to provide a meaningful soft and tough core. Examples of such thin areas include the ball flanges and shirttail. The faying surfaces and areas adjacent thereto must be maintained at a low carbon level because of the adverse effect excessive carbon has on the integrity of the welds at the faying surfaces. For example, cracks could develop creating leak paths. For those reasons carburization in rock bits was thought to require the selective area technique described.

SUMMARY OF THE INVENTION

The present invention provides an improved friction type rock bit segment, rock bit and method for their construction in which the surface of the entire friction bearing rock bit segment is carbon enriched and heat treated simultaneously to develop the requisite hardness in the zones of a journal and adjacent the journal.

It has been discovered that the heavy, carburized case on the journal areas is not necessary in friction bearing rock bits. A thin carbon enriched skin appropriately hardened in wear sensitive areas suffices. The thin skin is thin enough so that areas requiring a tough core will have a tough core. As a consequence, the entire leg or segment can be provided with a carbon enriched skin. Therefore, the carbon enrichment step and the hardening step can, in a sense, be combined by doing all the machining beforehand and then quenching the part from a temperature achieved for the carbon enrichment. The method of the present invention considerably reduces the task of preparing a rock bit segment by eliminating many procedures and much of the handwork done before.

In a particular form, the present invention contemplates completely fabricating a leg or segment of a rock bit, except for carbon enrichment of a thin layer of skin and heat treatment and the mounting of the cutter cones, bearings, and lubrication system. The segment is completely machined. Thus the faying surfaces, lubrication passages, threads and ball races are finish machined. After the machining, the entire segment surface is carbon enriched to develop a case of comparatively high carbon percentage content and then quenched to develop the desired hardness in the case and core. After quenching, the segment may be tempered. Preferably, carbon enrichment takes place in a carburizing atmosphere formed of dissociated methane and at a temperature of about 1500° F. to 1600° F. for about three hours. A case thickness of 0.005 to 0.020 inches thick with a carbon concentration of 0.4% to 0.9% at the surface grading down to base metal concentrations is satisfactory. Preferably case thickness is from about 0.010 to 0.015 inches and carbon concentration at the surface is from about 0.5% to about 0.7%. The carburizing atmosphere has a carbon potential of at least about 0.9% to 1.5% carbon. The process can be carried out under different operating conditions to achieve the same result. For example, higher temperatures and shorter times. Raising the carbon potential also shortens the time. Also the desired results may be obtained by methods using solid carburizing materials. Atmospheres containing both carbon and nitrogen may be used to produce a carbo-nitrided case.

The present invention contrasts with the prior art in the invention's simplicity. In the prior art a segment was preliminarily machined. Then stop-off was applied to control the areas to be carburized. The segment was then carburized in the journal area. After carburization, the segment was cooled slowly, selectively hand cleaned, finish machined, and then heat treated followed by final overall cleaning and grinding. The invention is markedly simpler.

Thses and other features, aspects and advantages of the present invention will become more apparent from the following description, appended claims and drawings.

BRIEF DESCRIPTION OF THE DRAWINGS

FIG. 1 illustrates a rock bit made in accordance with the present invention;

FIG. 2 illustrates in vertical half-section a segment or leg of a rock bit constructed in accordance with the present invention; and FIG. 3 is a graph of carbon concentration versus depth. Curve "A" illustrates the old art. Curve "B" illustrates the principles of the present invention.

DESCRIPTION OF THE PREFERRED EMBODIMENT

With reference to FIGS. 1 and 2, a single steel leg or segment 10 of a rock bit assembly 11 forms one element of the assembly. Typically, three such segments array around a vertical axis 12 and are welded together along faying surfaces to form a unitary drill bit. Such a weld is shown at 13 in FIG. 1.

A segment or leg includes an upper pin segment 14 having threads 15 for attachment to a drill string. An outer surface 16 of major radius of the rock bit is generally cylindrical in shape with a slight back draft. Each segment has a 120° angle between faying surfaces. A depending leg 18 provides a relief at 20 for rotation of a cone cutter 22. A shirttail 23 at the base of leg 18 protects the cone cutter. A journal 24 extends inwardly and downwardly from leg 18 and receives cone cutter 22 for rotation of the latter. The axis of the journal, indicated at 26, extends downwardly and inwardly towards the vertical axis of revolution of the rock bit assembly. Leg 18 adjacent the foot of journal 24 is machined at 28 to define an annular wear surface extending radially of the journal. The external surface of the journal is machined at 30 and surface 30 joins surface 28 through a radius 32. A seal, such as an O-ring 34, on journal 24 and abutting against surfaces 28, 32, and 30 provides a seal from the drilling environment into the interface between cutter 22 and the journal.

Rotary cutter 22 has a generally conical external surface and a cylindrical bore 36 in receipt of journal 24. The cutter can have tungsten carbide insert teeth 38, or the teeth can be integral, both being conventional.

The anterior end of journal 24 has a reduced diameter nose or spindle 40 in receipt of a friction bushing 42. The friction bushing mounts in the cone cutter. A thrust button 44 at the base of bore 36 of cutter 22 bears on a friction surface 46 of spindle 40 at the extreme anterior end of journal 24. A thrust face 47 of the journal at the base of the spindle extends radially of the axis of the journal to a diameter larger than the spindle. This thrust face takes the considerable thrust load exerted upon the journal by cone cutter 22. Spindle end 46 can take some of this thrust.

Cutter 22 mounts on journal 24 through a plurality of ball bearings 48 that track in an annular race 50 of the journal and an annular race 52 of the cutter. These races are radially aligned. These races are defined as surfaces of revolution around axis 26 generated by arcs of circles. A passage 54 opening into race 50 allows balls 48 to be inserted into the race after cutter 22 is positioned on the journal. A retainer plug 56 placed in passage 54 after balls 48 are in place in races 50 and 52 keeps the balls in position. The retainer plug can be welded in place as at 58. A longitudinal slot 60 in plug 56 provides for passage of lubricant to balls 48 and their races. The function of balls 48 is primarily to hold the cutter to the journal and not to take out thrust loads.

As is conventional, lubrication is provided from a pressure compensated reservoir 62. A boot 64 within the reservoir has one side exposed to drilling environment pressures by a passage 65 through a retaining plug 66. A cup 68 within a cavity 70 has an external flange 72 on a seat 73 of the leg. An annular ring 76 of boot 64 clamps between flange 74 and a flange 78 of plug 66. Grease fills the space exteriorly of boot 64 and within cavity 70. This grease communicates with the bearing surfaces of the segment through a passage 80 and a passage 82, both formed by drillings in the leg. Passage 80 opens into passage 82 and passage 82 in turn opens into slot 60. A radial drilling 90 into a groove 92 provides lubricant for the interface between the cone cutter and the journal. Groove 92 extends only part of the way around the journal. A hard metal bearing wear pad 94 extends around the bottom portion of the journal and bears the considerable radial compressive load produced by the weight of the drill string about the bit. To take load off the journal and avoid excessive compression of the O-ring, the wear pad extends out slightly from the surface of the journal. This extension is not shown.

As previously mentioned, O-ring 34 seals the bearing surfaces between the rotary cutter and the journal. The O-ring resides in an annular groove 98 of the cutter.

Pressure changes between grease inside the reservoir and drilling fluid outside the rock bit occur as the bit operates in changing environments of temperature, load, and external pressure. Changes occur in the effective volume of the grease that could cause loss of grease from the system or intrusion of foreign material into the bearings past O-ring 34, except for the pressure reservoir. Changes in grease volume produce changes in the space occupied by rubber boot 64 and the lubricant pressure therefore matches the environment outside the lubricant galleries.

What has been described up to here has been typical of friction bearing rock bit segments. The invention contemplates a modification of the segment in the manner of providing wear surfaces. Previously, the practice was to carburize only the wear surfaces on the journal and the annular wear ring at the foot of the journal against which the O-ring bears. Stop-off applied to the rest of the segment prevented it from carburizing. After carburization of the journal a slow cool and clean-up to get rid of undesired stop-off followed. The rest of the segment was then finish machined. Finally, the segment was heat treated to develop the hard case desired at the wear surfaces. This heat treatment required the heating of the part again, its quenching, and tempering.

By the present invention, this technique has been substantially simplified. No stop-off is applied and no clean-up required. Prior to heat treatment, the segment is finish machined. This includes drilling the grease reservoir and galleries, the tapping of threads for a jet nozzle 100 (see FIG. 1), all journal machining, and faying surface machining. The segment is then placed in a carbon enriching environment at an elevated temperature to get the required carbon content and depth of penetration in the wear surfaces of the journal and adjacent wear ring, and then the leg is rapidly cooled to develop the hardness desired. Tempering may follow. Heat treatment, then, accompanies carbon enrichment.

In one practical embodiment, the carbon enrichment environment was endothermically cracked methane enriched with methane corresponding to a carbon potential of 0.9% to 1%. Carburizing grade steel such as 4815 or 8720 is suitable. Carbon enrichment took place in the endothermically cracked methane enriched by methane at a temperature of 1550° F. to 1600° F. for three hours. The part was quenched in oil and tempered. The case was about 0.015 inches thick with carbon content of the steel at the surface of 0.6% to 0.9% grading down to base metal carbon content. In another practical example, case thickness of 0.010 to 0.015 inches with a carbon content of 0.5% to 0.7% at the surface grading down to base metal proved satisfactory. Carbon enrichment took place at 1550° F. for about three hours in a carbon enriching atmosphere of endothermically cracked methane with a carbon potential above 0.5% carbon. The segment was quenched in oil and tempered to develop the hardness desired in the carbon enriched surface and the core.

It is thought that higher enrichment temperatures can be used, for example, the 1700° F. used in the old carburizing technique. With higher temperatures, the enrichening time must be reduced. Also, the carbon potential can be varied. The carbon content at the surface can be between about 0.4% to about 0.9%. Below 0.4% there is insufficient carbon for the hardness required. The preferred range is from about 0.5% to about 0.7% carbon at the surface.

The thickness of the carbon enriched case is important. It should be within the range of from about 0.005 to about 0.020 inches. A case thickness of between about 0.010 to 0.015 inches is preferred. If the case thickness is too great, impact sensitive areas such as the threads of nozzle jet 100, shirttail 19, and the lands of ball race 50, will not have an ample core of soft and tough material. On the other hand, too thin a case results in wear surfaces of inadequate life.

If desired, the case can be carbo-nitrided by the techniques described here and with the addition of nitrogen to the atmosphere that gives carbon enrichment. The nitrogen atmosphere can be supplied by ammonia of up to 10% by volume. A carbo-nitrided case will be a little harder and a little more wear resistant than a carbon enriched case.

FIG. 3 illustrates carbon gradient versus depth from the surface. Curve "A" represents the prior art standard. Curve "B" represents the invention. As the curve "B" shows, the carbon content in the steel falls off below about 0.005 inches depth. This means a loss of hardness. With a case thickness less than 0.005, it can be seen that the effective skin thickness to resist wear becomes very thin. The carbon enriched skin thickness does not give accurate Rockwell "C" hardness because it is too thin. Hardness on the 15N scale converted by standard references to Rockwell "C" should be between about 55 to about 62 $R_c$. The carbon and depth tolerances are shown for both curves. The curve limits extend outside tolerance overlap so that the curves can be picked up.

It has been found with this technique of carbon enriching that the segment can be welded satisfactorily in the assembly of a complete rock bit. While the hardened surfaces in the journal have proven satisfactory for wear resistance, it is still necessary to provide a wear pad to take the considerable weight load of the drill string on the journal. The wear pad can be applied by a hard facing of such material as a nickel or cobalt based material. Other material suitable for rock bit journal bearings can also be used such as aluminum bronze. The wear pad may be finished by grinding to develop a slight offsetting, as described.

The present invention has been described with reference to a preferred embodiment. The spirit and scope of the appended claims should not, however, necessarily be limited to the foregoing description.

What is claimed is:

1. In a method for forming a drill bit segment of the friction bearing type for use in a rotary rock bit, the segment having a journal for mounting a rotary cutter, the journal having areas requiring hardening, and machined areas other than the journal, an improvement in the carbon enrichment and heat treating of the segment comprising the steps of:
   (a) completing the machining of the segment;
   (b) carbon enriching the entire segment surface at an elevated temperature in a carbon enriched atmosphere to develop a case on the segment, the elevated temperature being sufficient to effect hardening of the case upon quenching the segment; and
   (c) quenching the segment directly from the elevated temperature to develop the desired hardnesses in the case and the core.

2. The improvement claimed in claim 1 including the step of tempering the segment after the heat treatment step.

3. The improvement claimed in claim 2 wherein the carbon enrichment is done in an atmosphere including endothermically cracked methane.

4. The improvement claimed in claim 3 wherein the carbon enrichment is done at a temperature of between about 1500° F. to about 1600° F.

5. The improvement claimed in claim 4 wherein the carbon potential carburization atmosphere is above about 0.5% carbon.

6. The improvement claimed in claim 3 wherein the carbon potential of the carburization atmosphere is above about 0.5% carbon.

7. The improvement claimed in claim 3 wherein nitrogen is included in the carbon enriched atmosphere, the case being carbo-nitrided thereby.

8. The improvement claimed in claim 1 wherein the case is from about 0.005 to about 0.020 inches thick.

9. The improvement claimed in claim 8 wherein the case is from about 0.010 to about 0.015 inches thick.

10. The improvement claimed in claim 1 wherein the carbon at the surface of the case is from about 0.4% to about 0.9%.

11. The improvement claimed in claim 10 wherein the carbon at the surface of the case is from about 0.5% to about 0.7%.

12. The improvement claimed in claim 11 wherein the case is from about 0.005 to about 0.020 inches thick.

13. The improvement claimed in claim 12 wherein the case is from about 0.010 to about 0.015 inches thick.

14. An improvement in the process for fabricating multiple segment drill bits of the friction bearing type wherein each segment has a leg, a journal depending from the leg, faying surfaces for attachment by welding of the segment to adjacent segments, a cone cutter on each journal secured thereon by ball bearings tracking in radially aligned races of the cone cutter and the journal to effect axial interference between the ball bearings, cone cutter and journal along the axis of rotation of the cone, pressure compensated lubrication system means including a seal between the cutter and the journal, wear surfaces on the journal to bear radial loads of the cutter and thrust loads from the cutter, wear pad means on the journal to sustain the bulk of the radial loads on the journal applied by the cutter, and a seal wear surface on the journal and an adjacent surface of the leg bearing the seal, the process including the steps of:
 (a) completing the machining of the segment to develop the wear surfaces, bearing race and seal wear surface;
 (b) carbon enrichment of the entire segment surface in a carburizing atmosphere and at a temperature sufficiently high to effect hardening of the carbon enriched surface of the segment upon quenching of the segment;
 (c) quenching the segment directly after carbon enrichment thereof to develop a hardened case and core for the entire segment; and
 (d) assembling the segment with other of the so carbon enriched and heat treated segments together with cutter cones and pressure compensated lubricant means to develop a completed friction bearing rock bit.

15. The process claimed in claim 14 including the step of tempering the segment after the quenching step but before the assembling step.

16. The process claimed in claim 15 wherein the case is from about 0.005 to about 0.020 inches thick.

17. The process claimed in claim 16 wherein the case is from about 0.010 to about 0.015 inches thick.

18. The process claimed in claim 16 wherein the carburizing atmosphere includes nitrogen and the case becomes carbo-nitrided thereby.

19. The process claimed in claim 17 wherein the carburizing atmosphere includes nitrogen and the case becomes carbo-nitrided thereby.

20. The process claimed in claim 15 wherein the carbon at the surface of the case is from about 0.4% to about 0.9%.

21. The process claimed in claim 20 wherein the carbon at the surface of the case is from about 0.5% to about 0.7%.

22. The process claimed in claim 20 wherein the case is from about 0.005 to about 0.020 inches thick.

23. The process claimed in claim 22 wherein the case is from about 0.010 to about 0.015 inches thick.

24. The process claimed in claim 23 wherein the carbon enrichment takes place in an atmosphere including endothermically cracked methane.

25. The process claimed in claim 24 wherein the carbon enrichment atmosphere includes enrichening methane.

26. The process claimed in claim 24 wherein the carbon enrichment atmosphere has a carbon potential above about 0.5%.

27. The process claimed in claim 26 wherein the carbon enrichment takes place at a temperature of between about 1500° F. to about 1600° F. for a period of about three hours.

28. The process claimed in claim 27 wherein the carbon enrichment atmosphere includes enrichening methane.

* * * * *